(12) United States Patent
Coban et al.

(10) Patent No.: US 11,019,346 B2
(45) Date of Patent: May 25, 2021

(54) COEFFICIENT CODING WITH GROUPED BYPASS REMAINING LEVELS FOR DEPENDENT QUANTIZATION

(71) Applicant: QUALCOMM Incorporated, San Diego, CA (US)

(72) Inventors: Muhammed Zeyd Coban, Carlsbad, CA (US); Jie Dong, Sunnyvale, CA (US); Marta Karczewicz, San Diego, CA (US)

(73) Assignee: Qualcomm Incorporated, Sas Diego, CA (US)

( * ) Notice: Subject to any disclaimer, the term of this patent is extended or adjusted under 35 U.S.C. 154(b) by 49 days.

(21) Appl. No.: 16/459,164

(22) Filed: Jul. 1, 2019

(65) Prior Publication Data

US 2020/0007873 A1    Jan. 2, 2020

Related U.S. Application Data

(60) Provisional application No. 62/693,368, filed on Jul. 2, 2018.

(51) Int. Cl.
*H04N 19/18*    (2014.01)
*H04N 19/126*    (2014.01)
(Continued)

(52) U.S. Cl.
CPC ........... *H04N 19/18* (2014.11); *H04N 19/103* (2014.11); *H04N 19/126* (2014.11);
(Continued)

(58) Field of Classification Search
CPC .. H04N 19/103; H04N 19/124; H04N 19/126; H04N 19/13; H04N 19/176;
(Continued)

(56) References Cited

U.S. PATENT DOCUMENTS 6,625,321 B1 *   9/2003   Li .................. H04N 19/147
                                           375/E7.047
9,479,780 B2 *  10/2016   Kung .................. H04N 19/00
(Continued)

FOREIGN PATENT DOCUMENTS

EP       2637405 A1    9/2013
EP       3264763 A1    1/2018

OTHER PUBLICATIONS

Coban et al., "Non-CE7: Entropy Coding for Dependent Quantization," Joint Video Experts Team (JVET) of ITU-T SG 16 WP 3 and ISO/IEC JTC 1/SC 291WG 11, 11th Meeting: Ljubljana, SI, Jul. 10-18, 2018, JVET-K0070-v4 (8 pp).
(Continued)

*Primary Examiner* — Mohammed S Rahaman
(74) *Attorney, Agent, or Firm* — Shumaker & Sieffert, P.A.

(57) ABSTRACT

The disclosure describes example techniques for determining a context used for encoding or decoding flags used to indicate a value of a coefficient. The techniques also relate to determining a quantization or dequantization factor to use for the coefficient. For determining the context and the quantization or dequantization factor, a video coder may determine values of flags used for encoding or decoding a previous coefficient and use the determined values of the flags for determining the context and the quantization or dequantization factor for the current coefficient.

23 Claims, 8 Drawing Sheets

(51) Int. Cl.
  *H04N 19/96*   (2014.01)
  *H04N 19/463*  (2014.01)
  *H04N 19/103*  (2014.01)
  *H04N 19/176*  (2014.01)
(52) U.S. Cl.
  CPC ......... *H04N 19/176* (2014.11); *H04N 19/463* (2014.11); *H04N 19/96* (2014.11)
(58) Field of Classification Search
  CPC ...... H04N 19/18; H04N 19/463; H04N 19/91; H04N 19/96
  See application file for complete search history.

(56) References Cited

U.S. PATENT DOCUMENTS

| | | | |
|---|---|---|---|
| 2009/0154820 A1* | 6/2009 | Li | H04N 19/91 382/246 |
| 2011/0035225 A1* | 2/2011 | Mehrotra | H03M 7/40 704/500 |
| 2013/0003858 A1* | 1/2013 | Sze | H04N 19/122 375/240.18 |
| 2013/0051459 A1* | 2/2013 | Kirchhoffer | H04N 19/124 375/240.07 |
| 2013/0235925 A1* | 9/2013 | Nguyen | H04N 19/182 375/240.2 |
| 2018/0288416 A1* | 10/2018 | Huang | H04N 19/70 |
| 2020/0267403 A1* | 8/2020 | Lasserre | H04N 19/46 |

OTHER PUBLICATIONS

International Search Report and Written Opinion—PCT/US2019/040374—ISA/EPO—dated Oct. 11, 2019.
Marpe D., et al., "Unified PIPE-Based Entropy Coding for HEVC", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16); URL: http:/wftp3.itu.int/av-arch/jctvc-site/, No. JCTVC-F268, Jul. 15, 2011 (Jul. 15, 2011), pp. 1-21, XP030009291, section 6.1.
Albrecht M., et al., "Description of SDR, HDR and 360° Video Coding Technology proposal by Fraunhofer HHI", 10th JVET Meeting; Apr. 10, 2018-Apr. 20, 2018; San Diego; (The Joint Video Exploration Team of ISO/IEC JTC1/SC29/WG11 and ITU-T SG.16); URL:http://phenix.int-evry.fr/jvet/,,No. JVET-J0014-v4, Apr. 12, 2018, XP030151173, 122 pages.
Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.
Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.
Ergen S., "ZigBee/IEEE 802.15.4 Summary", Sep. 10, 2004, 37 pp.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.265, "Series H: Audiovisual and Multimedia Systems, Infrastructure of audiovisual services—Coding of moving video, High efficiency video coding," The International Telecommunication Union. Dec. 2016, 664 pp.
Schwarz H., et al., "CE7 Summary Report on Quantization and Coefficient Coding", Joint Video Experts Team (JVET) of ITU-T SG 16 WP 3 and ISO/IEC JTC 1/SC 29/WG 11, JVET-K0027, 11th Meeting: Ljubljana, SI, Jul. 10-18, 2018, 51 pages.
Schwarz H., et al., "Description of Core Experiment 7 (CE 7): Quantization and Coefficient Coding", Joint Video Experts Team (JVET) of ITU-T SG 16 WP 3 and ISOIIEC JTC 1/SC 29/WG 11, JVET-J1027-v4, 10th Meeting: San Diego, US, Apr. 10-20, 2018, 18 pages.
Sole J., et al., "Transform Coefficient Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1765-1777, XP011487805, ISSN: 1051-8215, DOI: 10.1109/TCSVT.2012.2223055.
International Preliminary Report on Patentability—PCT/US2019/040374—ISA/EPO—dated Jan. 14, 2021, pp. 8.

* cited by examiner

CE7.2.1, CE7.1.2 coding order

| Coeff 0 | | Coeff 1 | | ... | Coeff N-1 | |
|---|---|---|---|---|---|---|
| gtX, {X=0..4} | remLevel | gtX, {X=0..4} | remLevel | | gtX, {X=0..4} | remLevel |

Proposed coding order

| Coeff 0 | Coeff 1 | ... | Coeff N-1 | Coeff 0..N-1 |
|---|---|---|---|---|
| gtX, {X=0..4} | gtX, {X=0..4} | | gtX, {X=0..4} | remLevel | sign |

COEFFICIENT CODING WITH GROUPED BYPASS REMAINING LEVELS FOR DEPENDENT QUANTIZATION

This application claims the benefit of U.S. Provisional Application No. 62/693,368, filed Jul. 2, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coefficient coding schemes that enable efficient parsing of coefficients and enable quantization selection. As described in more detail, a video coder (e.g., video encoder or video decoder) may determine a set of contexts for coding a significance flag (e.g., a flag that indicates whether an absolute value for a coefficient value is greater than zero) for a current coefficient based on the significance flag of a previous coefficient (e.g., an immediately previous coefficient). Based on the determined set of contexts, the video coder may determine a context, and code the current coefficient based on the determined context.

In some examples, the coefficient values may be the result of quantization. In one or more examples, the video coder may determine the quantization factor used to quantize (e.g.,

2 for encoding) or dequantize (e.g., for decoding) in a similar manner. For example, the quantization factor for quantizing or dequantizing a current coefficient may be based on the significance flag of the previous coefficient. In some examples, the quantization factor for the current coefficient may also be based on the quantization factor that was used when coding the previous coefficient. For instance, the quantization factor used when coding the previous coefficient and the significance flag of the previous coefficient may indicate the quantization factor that is to be used for the current coefficient.

In this way, the example techniques provide a practical application for implementing video coding. For instance, the example techniques provide a mechanism that selects a context to use in coding a coefficient value. As described in more detail, the example techniques may provide advantages such as allowing all context-coded values to be grouped together and coded one after the other and then values that are bypass-coded are coded. By allowing all context-coded values to be grouped together, the video coder may not expend overhead switching between context-coding and bypass-coding such as in cases where context-coding and bypass-coding are interleaved.

In one example, the disclosure describes a method of coding video data, the method comprising selecting, for coding a current coefficient of the video data, a context set from a plurality of context sets based on whether a previous coefficient has an absolute value greater than zero, determining a context from the selected context set, and coding a value for the current coefficient based on the determined context.

In one example, the disclosure describes a device for coding video data, the device comprising a memory configured to store contexts for a plurality of context sets and a video coder comprising at least one of fixed-function or programmable circuitry. The video coder is configured to select, for coding a current coefficient of the video data, a context set from the plurality of context sets stored in memory based on whether a previous coefficient has an absolute value greater than zero, determine a context from the selected context set, and code a value for the current coefficient based on the determined context.

In one example, the disclosure describes a computer-readable storage medium storing instructions thereon that when executed cause one or more processors of a device for coding video data to select, for coding a current coefficient of the video data, a context set from a plurality of context sets based on whether a previous coefficient has an absolute value greater than zero, determine context from the selected context set, and code a value for the current coefficient based on the determined context.

In one example, the disclosure describes a device for coding video data, the device comprising means for selecting, for coding a current coefficient of the video data, a context set from a plurality of context sets based on whether a previous coefficient has an absolute value greater than zero, means for determining context from the selected context set, and means for coding a value for the current coefficient based on the determined context.

The details of one or more examples are set forth in the accompanying drawings and the description below. Other features, objects, and advantages will be apparent from the description, drawings, and claims.

BRIEF DESCRIPTION OF DRAWINGS

FIG. 6 is a conceptual diagram illustrating grouping of context-coded bins an bypass-coded bins.

DETAILED DESCRIPTION

Figure 1:
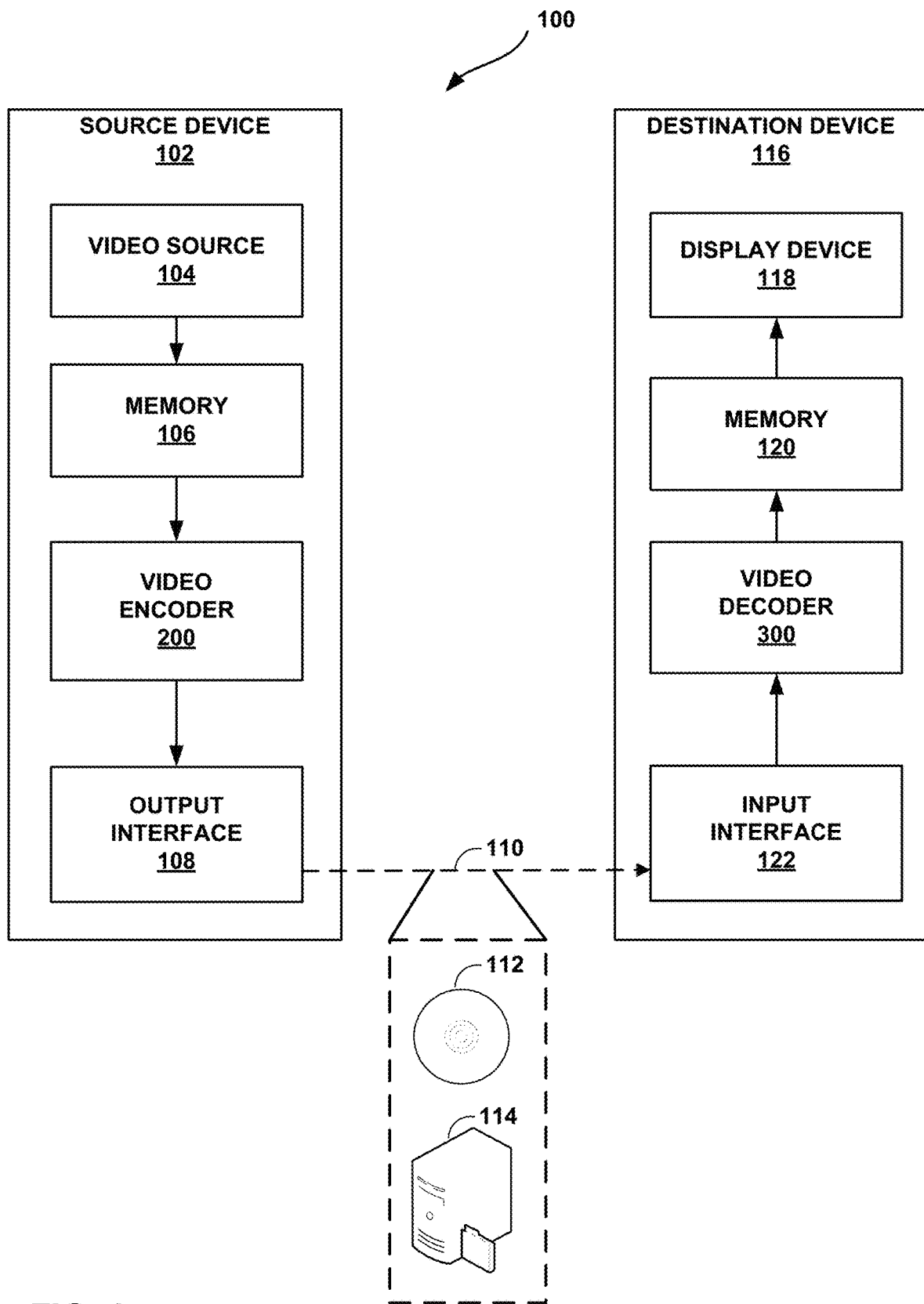
FIG. 1 is a block diagram illustrating an example video encoding and decoding system that may perform the techniques of this disclosure.

In video encoding, a video encoder determines a prediction block for a current block being encoded. The video encoder determines a residual (e.g., difference) between the prediction block and the current block. In some examples, the video encoder transforms the residual values from sample or pixel domain to a transform domain (e.g., frequency domain). The values in the transform domain are referred to as coefficient values. In some examples, the coefficient values are quantized to generate quantized coefficient values. For ease, in this disclosure, from the perspective of video encoding, the term "coefficient values" may refer to quantized coefficient values or coefficient values prior to quantization or where quantization is skipped.

The video encoder signals information that a video decoder uses to determine the coefficient values. As one example, the video encoder generates a significance flag (also called greater than 0 or gt0 flag). The significance flag indicates whether the absolute value of the current coefficient is greater than 0. The video encoder generates a gt1 flag (that indicates whether the absolute value of the current coefficient is greater than 1), gt2 flag (that indicates whether the absolute value of the current coefficient is greater than 2), a remainder level value (that indicates the remainder of the value of the coefficient greater than two), a sign value (that indicates whether the coefficient is positive or negative), and in some examples, a parity value (that indicates whether the coefficient is even or odd). In some examples, there may be a gt3 flag, or more generally a gtX flag, and the remainder level value may be adjusted accordingly as a remainder of the value of the coefficient greater than X.

The video encoder encodes the various flags and remainder level values. For example, the gtX flags, including the significance flag, are context coded and the remainder level value is bypass coded. Examples of context coding and bypass coding is described in more detail below.

The video decoder receives the encoded flags and remainder level values and performs the inverse operation as that of the video encoder to reconstruct the coefficient values (e.g., quantized coefficient values or regular coefficient values where quantization is skipped). For example, the video decoder may decode the encoded context coded flag values and the bypass coded remainder level value. Based on the flags, the video decoder may determine which coefficients have coefficient values greater than 0, 1, or 2, and use the remainder level values to determine the coefficient values.

In examples where quantization is applied, the video decoder may perform inverse quantization to determine the final coefficient values. From the perspective of video decoding, the coefficient values may refer to the coefficient values before inverse quantization or may refer to the inverse quantized coefficient values.

In one or more examples, to perform the context-based coding of the significance flag of a current coefficient, the video encoder may determine a set of contexts based on a significance flag of a previous coefficient (e.g., a previously coded coefficient, such as the coefficient that is coded immediately prior to the current coefficient being coded). As one example, assume there is a first set of contexts and a second set of contexts. In one example, if the significance flag of the previous coefficient was a one, then the video encoder may determine the first set of contexts. If the significance flag of the previous coefficient was a zero, then the video encoder may determine the second set of contexts. The video encoder may determine a context in the determined set of contexts such as based on significance flags of below and right coefficients, and context encode the significance flag for the current coefficient based on the determined context. The video encoder may perform similar operations for the other flags such as gt1, gt2, and more generally gtX.

The video decoder may perform similar operations to determine the contexts. For example, if the significance flag of the previous coefficient (e.g., previously coded coefficient, where the previous coefficient is immediately previous coefficient in coding order) was a one, then the video decoder may determine the first set of contexts. If the significance flag of the previous coefficient was a zero, then the video decoder may determine the second set of contexts. The video decoder may determine a context in the determined set of contexts such as based on significance flags of below and right coefficients, and context decode the significance flag for the current coefficient based on the determined context. The video decoder may perform similar operations for the other flags such as gt1, gt2, and more generally gtX.

Accordingly, this disclosure describes example techniques for context-based coding of a flag for a current coefficient based on a corresponding flag for a previous coefficient (e.g., an immediately previous coefficient). For example, context for the significance flag for the current coefficient is based on the significance flag of the previous coefficient, context for the gt1 flag for the current coefficient is based on the gt1 flag of the previous coefficient, and so forth. For example, context for the gt2 flag for the current coefficient may be based on the gt2 flag of the previous coefficient. The significance flag of the previous coefficient indicates which one of a plurality of context sets to use (e.g., select between a first set of contexts and a second set of contexts). Then, the video encoder and video decoder may determine a context from the selected one of the plurality of context sets.

In some examples, the video encoder may be configured to select between a plurality of quantization factors to apply to the coefficients to generate the quantized coefficient values. Similarly, the video decoder may be configured to select between a plurality of dequantization factors to apply to the quantized coefficient values to generate dequantized coefficient values. In one or more examples described in this disclosure, the video encoder and the video decoder may perform similar operations as those described above to determine the context for determining the quantization or dequantization factors.

For example, video encoder may determine whether absolute value of a previous coefficient value is greater than zero (e.g., whether the previous coefficient is significant). For the video encoder, the significance flag may not be generated until entropy coding. For quantization, the video encoder may consider whether the previous coefficient was significant (e.g., whether a previous coefficient has an absolute value greater than zero). Based on whether the previous coefficient was significant, the video encoder may determine a quantization factor for the current coefficient (e.g., for quantizing the current coefficient). In some examples, the video encoder may further utilize the quantization factor of the previous coefficient in combination with whether the previous coefficient was significant to determine the quantization factor for the current coefficient.

Similarly, for dequantization, the video decoder may consider whether the previous coefficient was significant (e.g., whether a previous coefficient has an absolute value greater than zero). For the video decoder, the significance flag for the previous coefficient should be available. In any case, the significance flag is indicative of whether the absolute value of a coefficient is greater than zero. Based on whether the previous coefficient was significant, the video decoder may determine a dequantization factor for the current coefficient (e.g., for dequantizing the current coefficient). In some examples, the video decoder may further utilize the dequantization factor of the previous coefficient in combination with whether the previous coefficient was significant to determine the dequantization factor for the current coefficient.

The example techniques may provide various advantages. For example, M. Abrecht, et al., "Description of SDR, HDR, and 360 video coding technology proposal by Fraunhofer HHI" JVET-J0014, 2018 (hereinafter JVET-J0014) described using parity of the previous coefficient to determine a context set for coding a significance flag for the current coefficient. However, one limitation with these techniques in JVET-J0014 is that the parity information (e.g., whether the coefficient value is odd or even) is not known until the coefficient value is fully reconstructed.

Therefore, the video encoder may have needed to perform context-coding for certain flags (e.g., significance flag, gt1, gt2 flags) followed by bypass-coding for remainder level value of a previous coefficient before being able to perform context-coding for flags of the current coefficient. Stated another way, in JVET-J0014, because the video decoder needed the parity value of the previous coefficient to decode the significance flag for the current coefficient, the video decoder needed to completely reconstruct the previous coefficient (e.g., context-decode the significance, gt1, gt2 flags and bypass-decode the remainder level value) before starting the decoding of the current coefficient (e.g., before being able to context-decode the significance flag of the current coefficient).

Accordingly, in the JVET-J0014 techniques, the context-coding and the bypass-coding is interleaved. For instance, a plurality of coefficients forms a coefficient group. In JVET-J0014, all flags and the remainder level value of the first coefficient in the coefficient group are encoded or decoded, which means the video encoder and the video decoder started with context-coding (e.g., for the flags) and then switched to bypass-coding (e.g., for the remainder level value). Then, for the second coefficient, in JVET-J0014, the video encoder and the video decoder switched back from bypass-coding to context-coding for encoding or decoding the flags of the second coefficient before switching back to bypass-coding for encoding or decoding the remainder level value for the second coefficient, and so forth.

Interleaving between context-coding and bypass-coding may negatively impact video coding performance. For instance, the video encoder and video decoder may need to be initialized for performing context-coding each time the video encoder and video decoder start to perform context-coding. As one example, each time the video encoder and the video decoder switch from bypass-coding to context-coding, the video encoder and the video decoder may need to be initialized, which utilizes processing cycles. However, once initialized, the video encoder and video decoder can context-encode or decode multiple flags without needing to be initialized again. The initialization of the video encoder and video decoder may be needed when switching from bypass to context-encoding or decoding.

In accordance with one or more examples described in this disclosure, since a flag for a current coefficient is encoded or decoded based on a corresponding flag in the previous coefficient, the video encoder and video decoder may not need to wait until the previous coefficient is completely encoded or decoded before starting the encoding or decoding of the current coefficient. In other words, there may not be a need to interleave between context-coding and bypass-coding. For example, the video encoder and the video decoder may context-encode or decode the significance flag for each coefficient in the coefficient group, then context-encode or decode the gt1 flag for each coefficient in the coefficient group, and then context-encode or decode the gt2 flag for each coefficient in the coefficient group. Once all of the context-coding is complete, the video encoder and video decoder may bypass-encode or decode the remainder level values for each of the coefficients. In this manner, the number of times the video encoder and the video decoder are initialized for context-encoding or decoding is reduced as compared to the JVET-J0014 techniques, resulting in reduced processing cycles and faster encoding and decoding.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, and as described in more detail, video encoder 200 of source device 102 and video decoder 300 of destination device 116 may be configured to apply the techniques for separating the bypass bins from regular coded bins in a transform unit (TU) or coefficient group for dependent quantization. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques described in this disclosure. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may include one or both of a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, JVET-N1001-v3 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of CTUs. Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As described in more detail, this disclosure describes coefficient coding schemes. M. Abrecht, et al., "Description of SDR, HDR, and 360 video coding technology proposal by Fraunhofer HHI," JVET-J0014, 2018 (hereinafter JVET-J0014) describes one example of coefficient coding schemes that enable efficient parsing of coefficients. To reiterate from above, video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC) with its extensions.

In HEVC, coefficients (e.g., transform coefficients of a transform unit) are coded (e.g., encoded or decoded) in bitplane by bitplane order (partially). As described above, coefficients may be coded using the significance (or gt0) flag, gt1 flag, and so forth. Gt0, gt1, and so forth, each make up a bitplane of the bits that are used to indicate the coefficient value. In bitplane by bitplane order, first in a coefficient group, gt0 (e.g., greater than zero and also call significance) flags of all coefficients are coded, followed by gt1 flags (e.g., greater than one), and followed by greater than 2 (gt2) flags (e.g., greater than two). The rest of the levels are coded as absolute value of the remaining coefficient level in bypass mode. The gt0, gt1, gt2 flags are context coded (e.g., CABAC). In other words, in HEVC, in a coefficient group, a video coder (e.g., video encoder 200 or video decoder 300) may context-code (e.g., encode or decode) the gt0 flags for all coefficients in the coefficient group, then context-code the gt1 flags for all coefficients in the coefficient group, and then context-code the gt2 flags for all coefficients in the coefficient group, and so on. Then, the video coder may bypass-code the remaining level values for the coefficients in the coefficient group.

One reason for using this approach is to group all bypass coded bins for simpler parsing. Also, not mixing the order of the bitplanes simplifies multi-bin decoding where contexts for sequentially decoded coefficients do not depend on the previous coefficient (breaks the dependency) and reduces the cases where speculative decoding needs to be performed (when the next bin to be decoded could belong to a different bitplane). This kind of design improves the arithmetic coding throughput. J. Sole, et. A1, "Transform Coefficient Coding in HEVC", IEEE CSVT, December 2012 discusses transform coefficient coding in HEVC.

The coefficient coding scheme in JVET-J0014 breaks this scheme by requiring all bitplanes of a coefficient to be decoded before moving on to the next (e.g., gt0, gt1, gt2, remaining level values for a first coefficient need to be decoded before moving to the next coefficient). JVET-J0014 also interleaves the bypass and context coded bins, making multi-bin arithmetic coding difficult. For instance, as described above, interleaving between context-coding and bypass-coding can negatively impact processing time because the context-coding engine of video encoder 200 and video decoder 300 needs to be initialized each time when transitioning from bypass-coding to context-coding.

In this disclosure, an alternative scheme that separates the bypass bins from regular coded bins in a TU or coefficient group for dependent quantization is described. For instance, a video coder (e.g., video encoder 200 or video decoder 300) may select, for coding a current coefficient (e.g., a significance flag of the current coefficient), a context set from a plurality of context sets based on whether a previous coefficient (e.g., an immediately previous coefficient in coding order) has an absolute value greater than zero. As one example, video encoder 200 and video decoder 300 may have determined a significance flag (e.g., gt0 flag) for the previous coefficient that indicates whether the absolute value of the previous coefficient is greater than zero. Video encoder 200 and video decoder 300 may utilize the significance flag of the previous coefficient, as one non-limiting example way in which to determine whether the previous coefficient has an absolute value greater than zero.

For instance, there may be a first context set and a second context set. The first context set and the second context set each include a plurality of contexts (e.g., probability values). If the previous coefficient was significant (e.g., the absolute value of the previous coefficient was greater than zero), then video encoder 200 and video decoder 300 may select the first context set, and if the previous coefficient was not significant (e.g., the absolute value of the previous coefficient was not greater than zero), the video encoder 200 and video decoder 300 may select the second context set.

Video encoder 200 and video decoder 300 may determine the context from the selected context set. As one example, video encoder 200 and video decoder 300 may determine context from the selected context set based on values of neighboring coefficients. For example, video encoder 200 and video decoder 300 may determine an offset value in the selected context set based on whether a bottom coefficient and a right coefficient were significant or not (e.g., had absolute values greater than 0). Based on the determination (e.g., neither was significant, bottom coefficient was significant but right coefficient was not, right coefficient was significant but bottom coefficient was not, and both were significant), video encoder 200 and video decoder 300 may determine the offset value in the selected context set, and determine the context based on the offset value. For instance, the offset value may be considered as an index in the selected context set.

Video encoder 200 and video decoder 300 may encode or decode a value for the current coefficient based on the determined context. As one example, video encoder 200 and video decoder 300 may utilize CABAC techniques to context-encode or decode the significance flag for the current coefficient based on the determined context.

In this manner, video encoder 200 and video decoder 300 may be able to encode or decode the significance flag for the current coefficient without needing to encode or decode the entire previous coefficient. For example, the significance flag of the previous coefficient is needed but the rest of the flags, parity information, and remainder level value of the previous coefficient are not needed for coding the significance flag of the current coefficient.

Accordingly, in some examples, the current coefficient is a current coefficient of a coding group that includes a plurality of coefficients. Video encoder 200 and video decoder 300 may encode or decode a significance flag of each respective coefficients in the plurality of coefficients that follow the current coefficient before coding subsequent flags used to indicate the value of the current coefficient. In other words, video encoder 200 and video decoder 300 may encode or decode all significance flags in the coefficient group followed by gt1 flags in the coefficient group, and so on.

Video encoder 200 and video decoder 300 may utilize similar techniques for encoding and decoding other flag values. For instance, in some examples, video encoder 200 and video decoder 300 may select, for coding a current coefficient (e.g., coding a gtX flag), a context set from a plurality of context sets based on whether a previous coefficient has an absolute value greater than X.

Stated another way, video encoder 200 and video decoder 300 may select, for coding a flag of a current coefficient, a context set from a plurality of context sets based on a corresponding flag of a previous coefficient. In this example, the flag of the current coefficient and the corresponding flag of the previous coefficient are the same type of coefficient (e.g., both are significance flags, both are gt1 flags, both are gt2 flags, and so forth). In some examples, there may not be a plurality of context sets for some flags. For instance, gt1 flag may only have one context set rather than a plurality of context sets. In such examples, video encoder 200 and video decoder 300 may utilize other techniques to determine the context used for encoding or decoding the gt1 flag.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
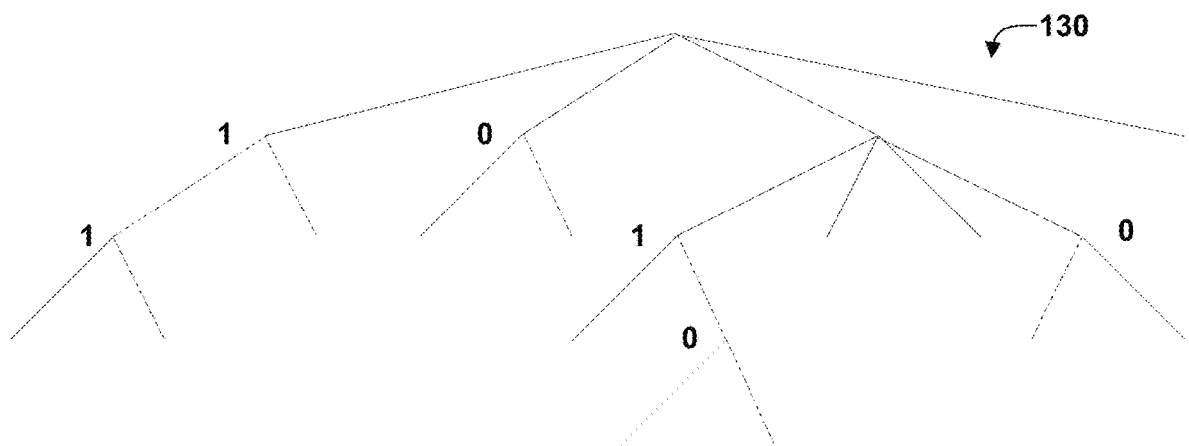
FIGS. 2A and 2B are conceptual diagrams illustrating an example quadtree binary tree (QTBT) structure, and a corresponding coding tree unit (CTU).
Figure 2B:
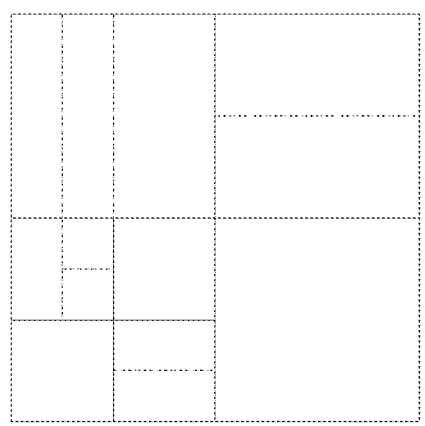

FIGS. 2A and 2B are conceptual diagram illustrating an example QTBT structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, then the node may not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having width equal to MinBTSize (4, in this example) implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

As described above, one technical problem that may exist in the field of video coding is that JVET-J0014 requires all bitplanes of a coefficient to be decoded before moving on to the next. The JVET-J0014 techniques also interleave the bypass and context coded bins, making multi-bin arithmetic coding difficult.

For example, in dependent quantization algorithm of CE7.2.1 the coefficients are coded coefficient by coefficient. CE7.2.1 is a core experiment that is testing a part of JVET-J0014. CE7.2.1 is described in Schwarz et. al. "Description of Core Experiment 7 (CE 7): Quantization and coefficient coding" JVET of ITU-T SG 16 WP 3 and ISO/IEC JTC 1/SC 29/WG 11, $10^{th}$ meeting: San Diego, US, 10-20 Apr. 2018 (hereinafter JVET-J1027) and JVET-K0027.

In the above examples, video encoder 200 and video decoder 300 are described as determining the context set from plurality of context sets for flags based on corresponding flags in the previous coefficient. In some examples, the quantization or dequantization factor that video encoder 200 and video decoder 300 apply may be based on the value of the previous coefficient. For example, there may be two quantization or dequantization factors represented by Q0 and Q1 and are also referred to as quantizers.

In some examples, whether video encoder 200 and video decoder 300 apply Q0 or Q1 to the current coefficient is based on whether the previous coefficient has an absolute value greater than zero. In addition, the quantization or dequantization factor used for the current coefficient may be based the quantization or dequantization factor used for the previous coefficient, as is explained in more detail with respect to a state diagram of FIG. 4. Hence, in addition to example ways in which to determine the context for encoding or decoding, this disclosure describes example techniques for determining the quantization or dequantization factor that is applied.

In JVET-J0014, the dependent quantization state machine states depend on the parity of the coefficient levels. The coefficient significance and greater than 1 (gt1) flags coding contexts as well as the quantizers used for a coefficient are selected by the state of the previously coded coefficient. This scheme results in interleaved regular coded bins and bypass coded bins at coefficient level within a coefficient group. In the techniques described in this disclosure, a 4-state, two scalar quantizer Trellis Coded Quantization similar to the one described in JVET-J0014 is used, and described in more detail with respect to FIG. 4. First, the two scalar quantizers (e.g., quantization or dequantization factors Q0 and Q1) as shown in FIG. 3 are used for performing the quantization.

Figure 3:
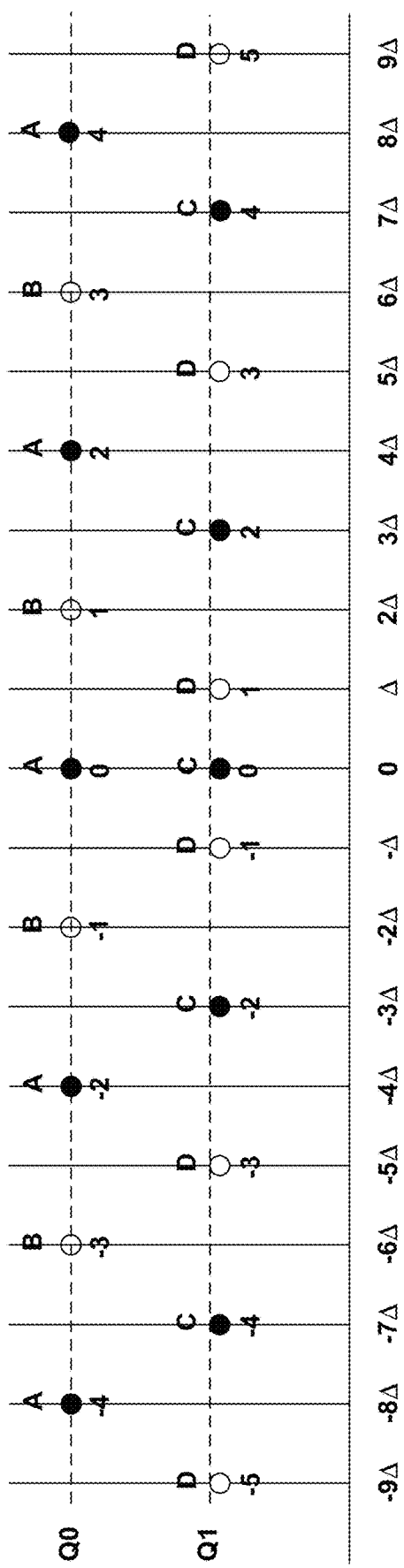
FIG. 3 is a conceptual diagram illustrating examples of two scalar quantizers.

FIG. 3 illustrates the use of two scalar quantizers (e.g., two quantization and dequantization factors). The first quantizer Q0 maps the transform coefficient levels (the numbers below the points) to even integer multiples of the quantization step size Δ. The second quantizer Q1 maps the transform coefficient levels to odd integer multiples of the quantization step size Δ or to zero in JVET-J0014.

In JVET-J0014, transform coefficients are quantized in coding order and the quantizer (e.g., quantization or dequantization factor) that is used to perform the quantization is selected based on a state machine that is driven by its previous state and the parity of the level of the previously coded coefficient. The state machine and the example states are described in the example illustrated in FIG. 4.

Figure 4:
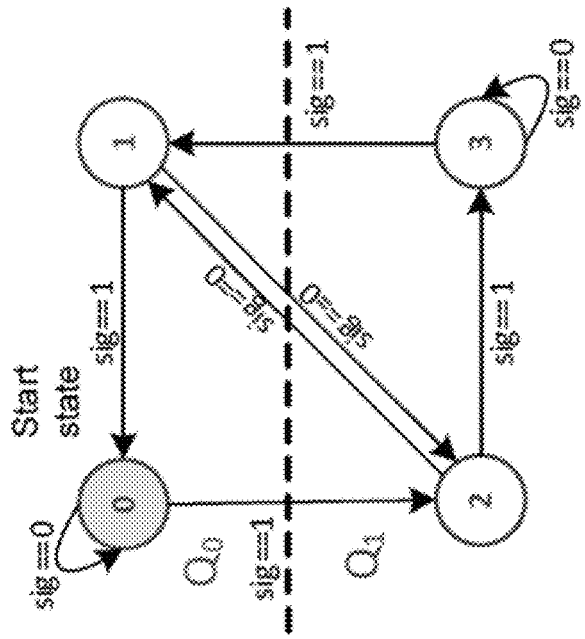
FIG. 4 is a conceptual diagram illustrating a state machine for coefficient significance-driven state machine.

For instance, FIG. 4 illustrates a state machine diagram for coefficient significance-driven state machine. In particular, rather than relying upon the parity information, as is done in JVET-J0014, in FIG. 4, the significance information is used to drive the state machine. For instance, unlike the example of FIG. 3, in which parity information is used to determine the quantization or dequantization factor, in one or more examples, the significance information is used to determine the quantization or dequantization factor.

In FIG. 4, transitioning from one state to another state is based on the current position in the state machine and the significance value. For example, assume that the current position in the state machine is "0." In this example, if a coefficient is significant (e.g., has an absolute value greater than zero), the state changes to state 2. If a coefficient is not significant, the state remains at state 0.

Assume that the current position in the state machine is "1." In this example, if a coefficient is significant, the state changes to state 0. If a coefficient is not significant, the state changes to state 2. Assume that the current position in the state machine is "2." In this example, if a coefficient is significant, the state changes to state 3. If a coefficient is not significant, the state changes to state 1. Assume that the current position in the state machine is "3." In this example, if a coefficient is significant, the state changes to state 1. If a coefficient is not significant, the state remains at state 3.

The example state diagram illustrated in FIG. 4 may be used to understand the quantization or dequantization factor that is selected. For instance, as illustrated, Q0 is associated with states 0 and 1 and Q1 is associated with states 2 and 3. Accordingly, if for the current coefficient the state is 0 or 1, then video encoder 200 and video decoder 300 may quantize or dequantize using quantization or dequantization factor Q0. If for the current coefficient the state is 2 or 3, then video encoder 200 and video decoder 300 may quantize or dequantize using quantization or dequantization factor Q1.

For example, assume that the state after coding the previous coefficient is state 0. In this example, if the previous coefficient is significant, then the state becomes state 1, and the current coefficient is quantized or dequantized using the quantization or dequantization factor Q1. In this example, if the previous coefficient is not significant, then the state remains state 0, and the current coefficient is quantized or dequantized using the quantization or dequantization factor Q0.

Assume that the state after coding the previous coefficient is state 1. In this example, if the previous coefficient is significant, then the state becomes state 0, and the current coefficient is quantized or dequantized using the quantization or dequantization factor Q0. In this example, if the previous coefficient is not significant, then the state becomes state 2, and the current coefficient is quantized or dequantized using the quantization or dequantization factor Q1.

Assume that the state after coding the previous coefficient is state 2. In this example, if the previous coefficient is significant, then the state becomes state 3, and the current coefficient is quantized or dequantized using the quantization or dequantization factor Q1. In this example, if the previous coefficient is not significant, then the state becomes state 1, and the current coefficient is quantized or dequantized using the quantization or dequantization factor Q0.

Assume that the state after coding the previous coefficient is state 3. In this example, if the previous coefficient is significant, then the state becomes state 1, and the current coefficient is quantized or dequantized using the quantization or dequantization factor Q0. In this example, if the previous coefficient is not significant, then the state remains state 3, and the current coefficient is quantized or dequantized using the quantization or dequantization factor Q1.

It should be noted that the state diagram of FIG. 4 is provided for ease of illustration and should not be considered limiting. The state-machine may be different in that transitioning from one state to another may be based on different criteria (e.g., rather than transitioning from state 1 to state 0 when coefficient is significant, the state may transition from state 1 to state 3 when coefficient is significant). The other states may be changed accordingly as well.

In this manner, video encoder 200 and video decoder 300 may select at least one of a quantization or dequantization factor for the current coefficient based on whether the previous coefficient has an absolute value greater than zero and at least one of apply the selected quantization or dequantization factor for the current coefficient. As illustrated and described, in addition to whether the previous coefficient is significant, in some examples, the quantization or dequantization factor used for the previous coefficient (e.g., the state before the transition) may be used to select the quantization or dequantization factor. In other words, video encoder 200 and video decoder 300 may select at least one of the quantization or dequantization factor based on a quantization or dequantization factor used when quantizing or dequantizing the previous coefficient (e.g., whether the state was state 0, 1, 2, or 3) and whether the previous coefficient has an absolute value greater than zero (e.g., to indicate where the state is to transition to).

As described above, video encoder 200 and video decoder 300 may each utilize the example techniques described in this disclosure to determine the context to use for encoding or decoding the current coefficient and to determine the quantization or dequantization factor that is to be used (e.g., for quantizing a coefficient to generate a quantized coefficient for dequantizing a quantized coefficient to generate the coefficient). As described in this disclosure, for video encoder 200, the coefficient may refer to the coefficient before or after quantizing. For video decoder 300, the coefficient may refer to the quantized coefficient or the result of dequantizing.

In some examples, there may be correlation between the quantization or dequantization factor that is applied and the context. For example, quantization or dequantization factor Q0 may be correlated with the first context set of the plurality of context sets, and quantization or dequantization factor Q1 may be correlated with the second context set of the plurality of context sets.

In some examples, if video encoder 200 determined that a current coefficient is to be quantized using quantization factor Q0, then video encoder 200 may determine that the context for encoding the current coefficient is in the first context set. If video encoder 200 determined that a current coefficient is to be quantized using quantization factor Q1, then video encoder 200 may determine that the context for encoding the current coefficient is in the second context set. Similarly, if video decoder 300 determined that a current coefficient is decoded using a context in the first context set, then video decoder 300 may determine that the current coefficient is to be dequantized using dequantization factor Q0. If video decoder 300 determined that a current coefficient is decoded using a context in the second context set, then video decoder 300 may determine that the current coefficient is to be dequantized using dequantization factor Q1.

Accordingly, in implementation, once video encoder 200 determines the quantization factor, video encoder 200 may not need to perform additional operations to determine the context set since the context set can be determined based on the quantization factor that video encoder 200 selected. However, even in such examples, since the quantization factor is based on whether a previous coefficient has an absolute value greater than zero, video encoder 200 may be considered as selecting, for coding a current coefficient, a context set from a plurality of context sets based on whether a previous coefficient has an absolute value greater than zero.

Also, in implementation, once video decoder 300 determines the context set from a plurality of context sets, video decoder 300 may not need to perform additional operations to determine the dequantization factor since the dequantization factor can be determined based on the context that video decoder 300 selected. However, even in such examples, since the context set is based on whether a previous coefficient has an absolute value greater than zero, video decoder 300 may be considered as selecting at least one of a quantization or dequantization factor for the current coefficient based on whether the previous coefficient has an absolute value greater than zero.

Therefore, in some examples, video encoder 200 and video decoder 300 may be considered as selecting the context set from the plurality of context sets based on the selected quantization or dequantization factor. For instance, video encoder 200 determines the quantization factor and then determines the context set from the quantization factor. In some examples, video encoder 200 and video decoder 300 may be considered as selecting the quantization or dequantization factor based on the selected context set. For instance, video decoder 300 selects the context set from the plurality of context sets and then determines the dequantization factor from the context set.

Figure 5:
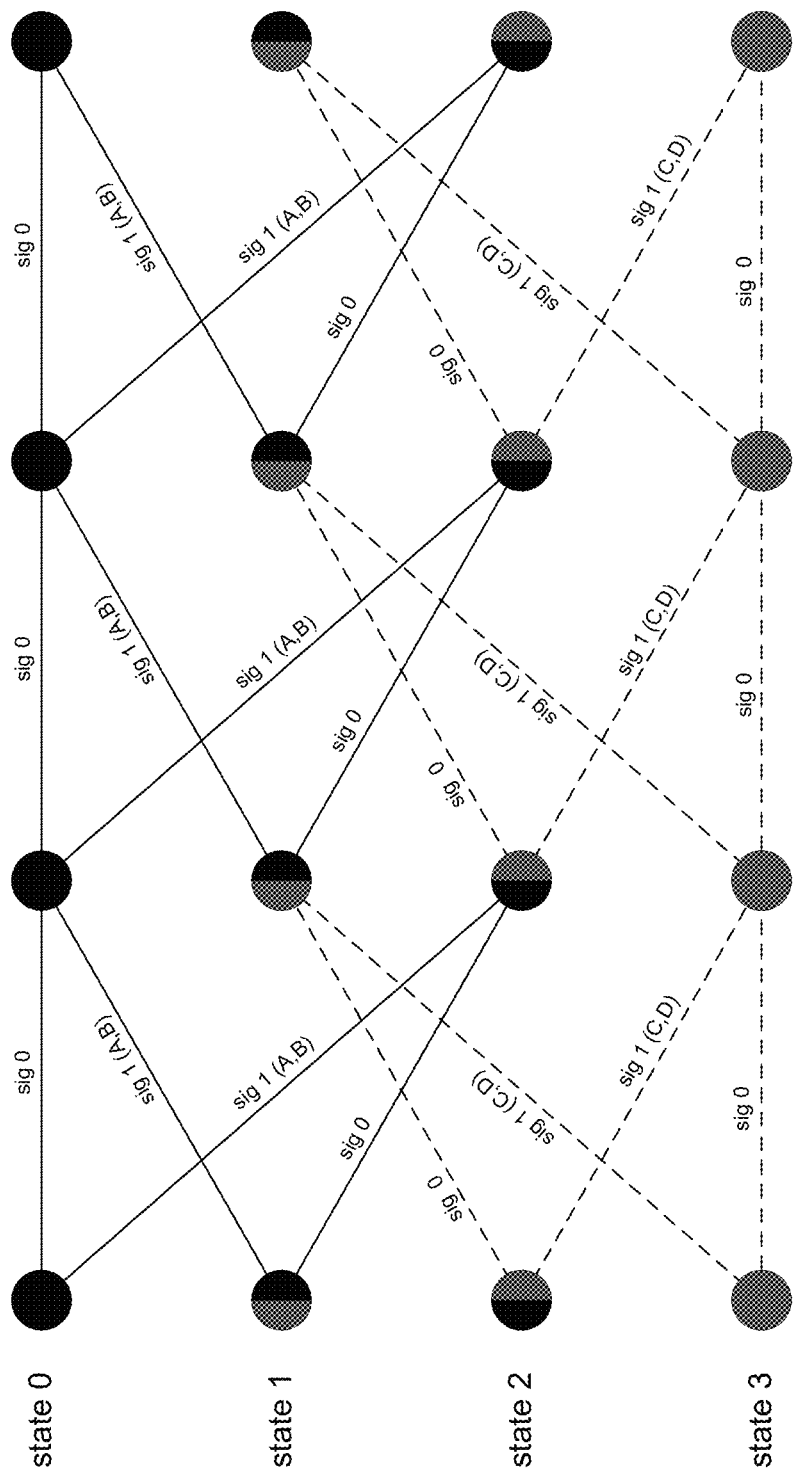
FIG. 5 is a conceptual diagram illustrating a trellis diagram for a coefficient significance driven state machine.

On the encoder side (e.g., video encoder 200), the trellis to decide the coefficient levels is illustrated in FIG. 5. For instance, FIG. 5 illustrates an encoder trellis diagram for coefficient significance driven state machine. FIG. 5 illustrates the transition from state to state of the example illustrated in FIG. 4 as described above.

As described above, in some examples, the states 0 and 1 use quantizer Q0, and states 2 and 3 use quantizer Q1. For significance map coding, the context set used to code is selected based on the quantizer used, i.e., Qx where x=state>>1. In other words, video encoder 200 or video decoder 300 may determine the quantizer (e.g., quantization or dequantization factor) and select the context set from the plurality of context sets, or vice-versa. In some examples, the greater than 1flag (gt1) context set only uses one context set that is identical to the context set used for coding of gt1 flag used in coefficient coding in core experiments (CE) 7.1.2, as part of JVET-J0014.

In one or more example techniques described in this disclosure, to overcome the technical problem noted above, with a technical solution rooted in video coding technology, in a coefficient group regular coded level bins (e.g., sig, gt1, gt2, gt3, gt4) are coded with the same contexts as in CE 7.2.1 (except for gt1, i.e., single set) coefficient by coefficient in the first pass; this is followed by grouped remaining level coding for all coefficients in a coefficient group. The context index derivation is identical to the method used in CE7.2.1 where full coefficient levels are replaced by coefficient levels reconstructed using up to the highest coded regular coded bin (resulting index is equal to the index derived from full coefficient value). The remaining level coding is identical to the scheme used in CE7.1.2 and CE7.2.1, as part of JVET-J0014, where a Rice Parameter used for coding of bypass coded remainder level bins are derived from full value of neighboring reconstructed levels.

For example, in CE 7.2.0, as part of JVET-J0014, the following contexts are used. For significant coefficients (e.g., non-zero), the contexts are sig[0][18], sig[1][18]. For coefficients with value greater than 1 (gt1), the contexts are gt1[0][21], gt1[1][21]. For coefficients with value greater than 2, 3, and 4 (gt2, gt3, gt4), the context is gtX (X being 2, 3, or 4) [21]. In summary, sig and gt1 has 2 sets of contexts, and all the rest have one set.

In examples described in this disclosure, the contexts for significant (sig) are sig[0][18], sig[1][18]. For gt1, the context is gt1[21], and for gtX, the context is gtX[21]. Accordingly, in this disclosure, gt1 has one set. Contexts are neighboring information that maps to a probability that is used during entropy coding. If there are two distinct cases (different statistics), the probabilities should not mix and need separate contexts; otherwise it is better to mix them (e.g., in a single context).

The change in the bitstream format is illustrated by the example of FIG. 6. For example, FIG. 6 illustrates the proposed syntax, grouped bypass coded bins.

In some examples, the gt0, gt1, gt2, gt3, gt4, or some subset like gt0, gt1 or gt0, gt1, gt2, like bit planes can be bitplane by bitplane coded using contexts from the info available up to the ith bitplane that is available (similar to the one described in JEM noted above) followed by remaining level bins and sign bins. This way, there is no interleaving of gtX {X: 0, . . . 4} regular coded bins at the coefficient level. Also, a restriction on a number of total number of regular coded bins can be imposed; that is, once the limit of regular coded bin count is reached within a bitplane, the remainder of the bitplane is also regular coded, and the next bitplane starts with bypass coding of bins.

Figure 7:
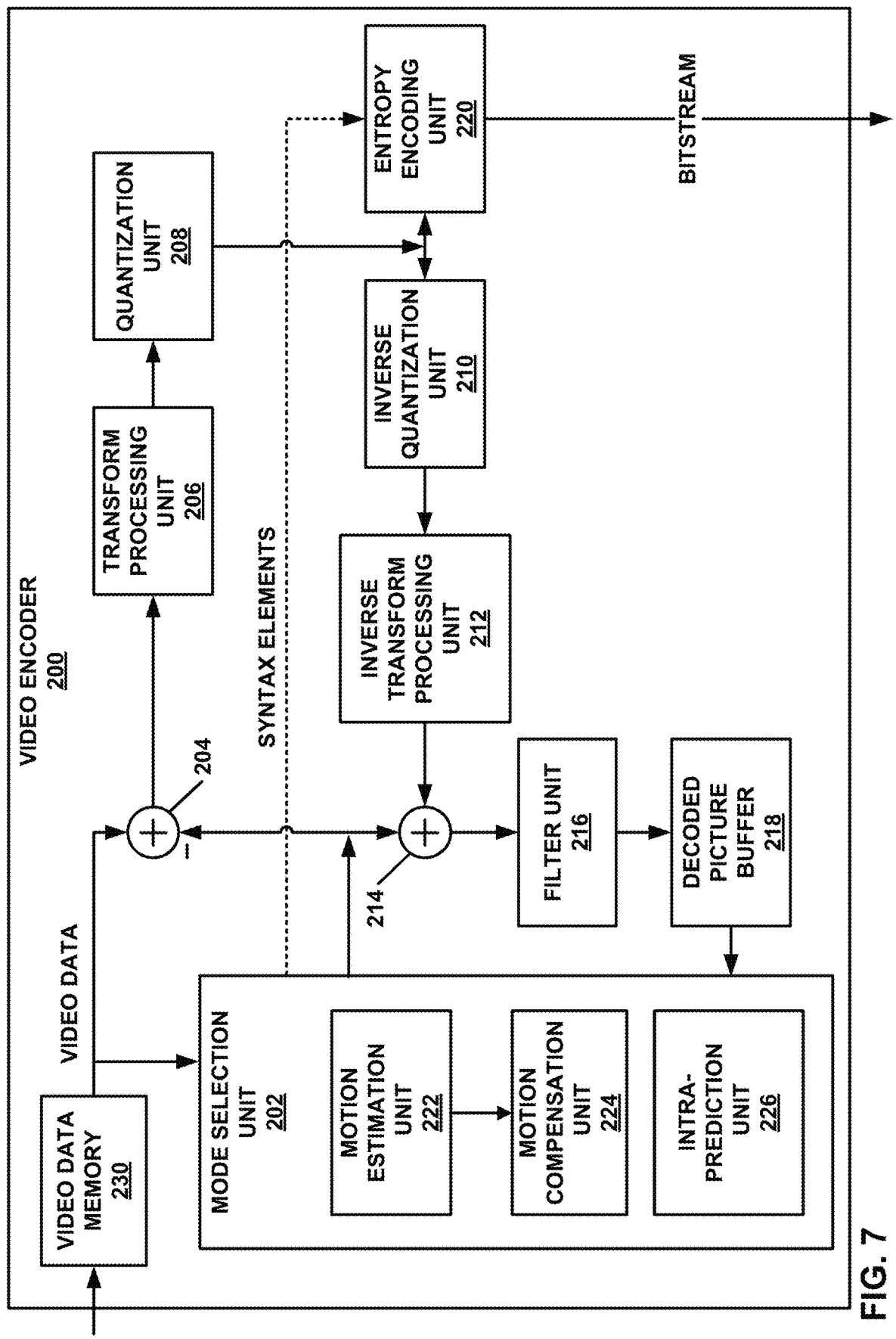
FIG. 7 is a block diagram illustrating an example video encoder that may perform the techniques of this disclosure.

FIG. 7 is a block diagram illustrating an example video encoder 200 that may perform the techniques of this disclosure. FIG. 7 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 (e.g., VVC) video coding standard in development. However, the techniques of this disclosure are not limited to these video coding standards, and are applicable generally to video encoding and decoding.

In the example of FIG. 7, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to perform example techniques described in this disclosure. For example, video data memory or some other memory may store contexts for a plurality of context sets, each context set including one or more contexts. Quantization unit 208 may perform quantization using the example techniques described in this disclosure. As one example, quantization unit 208 may be configured to determine quantization factor Q0 and Q1. Quantization unit 208 may determine a quantization factor for the current coefficient based on whether a previous coefficient has an absolute value greater than zero. In some examples, quantization unit 208 may select the quantization factor for the current coefficient based on the quantization factor used when quantizing the previous coefficient and whether the previous coefficient has an absolute value greater than zero, as described above. Quantization unit 208 may apply the selected quantization factor for the current coefficient.

Entropy encoding unit 220 may be configured to select, for coding a current coefficient (e.g., significance flag of the current coefficient), a context from the plurality of context sets stored in video data memory or elsewhere based on whether a previous coefficient has an absolute value greater than zero. One way in which entropy encoding unit 220 may determine the context set is based on the quantization factor used by quantization unit 208. For instance, if quantization unit 208 utilized Q0 based on whether the previous coefficient has an absolute value greater than zero, then entropy encoding unit 220 may utilize the first context set. If quantization unit 208 utilized Q1 based on whether the previous coefficient has an absolute value greater than zero, then entropy encoding unit 220 may utilize the second context set. Since the selection of Q0 or Q1 is based on whether the previous coefficient has an absolute value greater than zero, entropy encoding unit 220 may be considered as selecting a context set based on whether a previous coefficient has an absolute value greater than zero.

Entropy encoding unit 220 may determine context from selected context set. For instance, entropy encoding unit 220 may determine context based on values of neighboring coefficients. The values of neighboring coefficients may be indicative of an offset into the selected context set from which entropy encoding unit 220 determines the context. Entropy encoding unit 220 may encode the current coefficient based on the determined context (e.g., perform CABAC operations based on the determined context). In some examples, the current coefficient is a current coefficient of a coding group that includes a plurality of coefficients. Entropy encoding unit 220 may be configured to encode a significance flag of each respective coefficients in the plurality of coefficients that follow the current coefficient before encoding subsequent flags used to indicate the value of the current coefficient.

Figure 8:
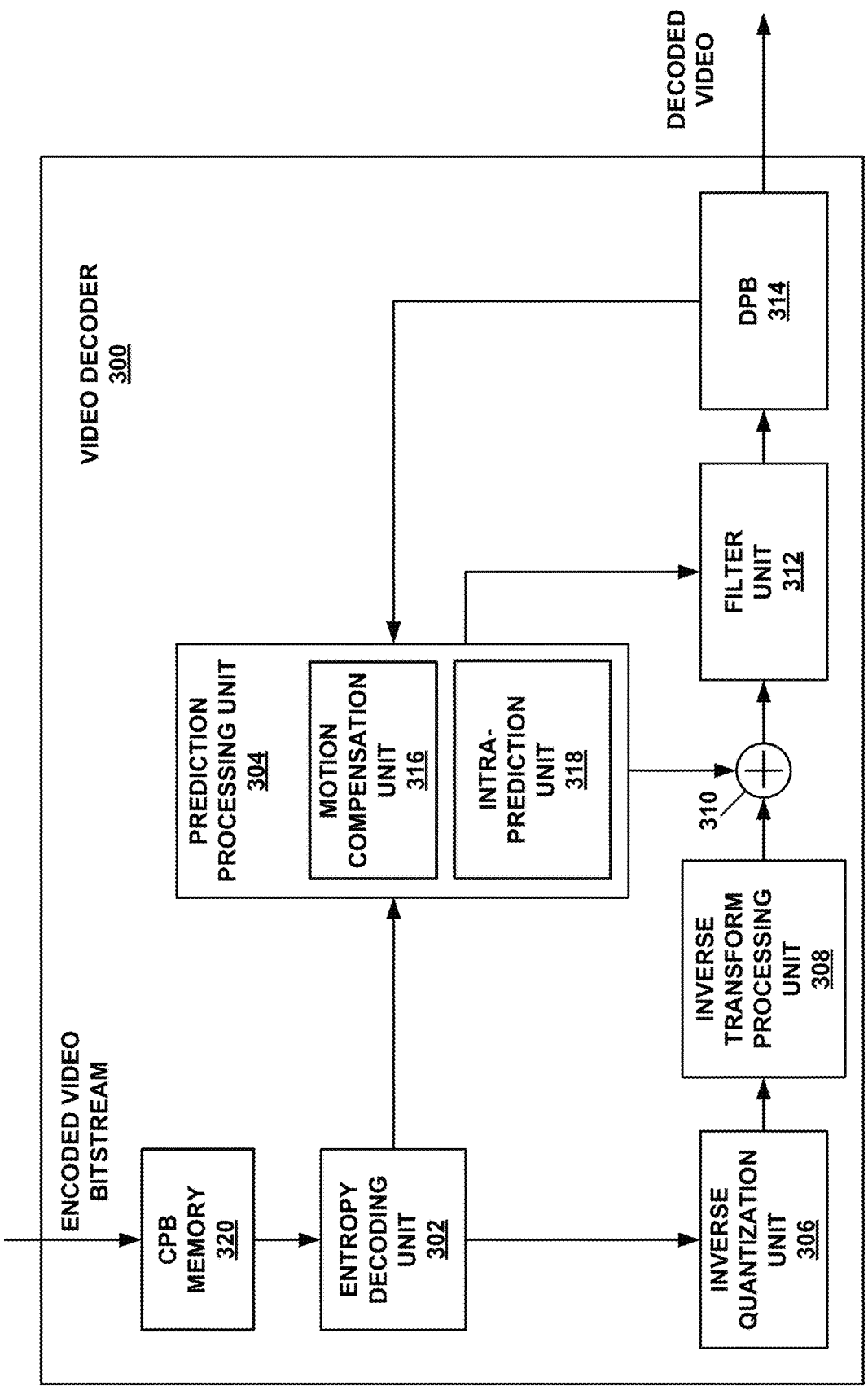
FIG. 8 is a block diagram illustrating an example video decoder that may perform the techniques of this disclosure.

FIG. 8 is a block diagram illustrating an example video decoder 300 that may perform the techniques of this disclosure. FIG. 8 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 8, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 8 are illustrated to assist with understanding the operations performed by video decoder 300. The units may be implemented as fixed-function circuits, programmable circuits, or a combination thereof. Similar to FIG. 7, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 7).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 7). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a device configured to perform example techniques described in this disclosure. For example, memory of or coupled to video decoder 300 may store contexts for a plurality of context sets, each context set including one or more contexts. Entropy decoding unit 302 may be configured to select, for coding a current coefficient (e.g., significance flag of the current coefficient), a context from the plurality of context sets stored in memory based on whether a previous coefficient has an absolute value greater than zero. For example, if the previous coefficient has an absolute value greater than zero, then entropy decoding unit 302 may select a first context set. If the previous coefficient has an absolute value that is not greater than zero, then entropy decoding unit 302 may select a second context set.

Entropy decoding unit 302 may determine a context from the selected context set. For instance, entropy decoding unit 302 may determine the context based on values of neighboring coefficients. The values of neighboring coefficients may be indicative of an offset into the selected context set from which entropy decoding unit 302 determines the context. Entropy decoding unit 302 may decode the current coefficient based on the determined context (e.g., perform CABAC operations based on the determined context). In some examples, the current coefficient is a current coefficient of a coding group that includes a plurality of coefficients. Entropy decoding unit 302 may be configured to decode a significance flag of each respective coefficient in the plurality of coefficients that follows the current coefficient before decoding subsequent flags used to indicate the value of the current coefficient.

Inverse quantization unit 306 may perform dequantization using the example techniques described in this disclosure. As one example, inverse quantization unit 306 may be configured to determine dequantization factor Q0 and Q1. Inverse quantization unit 306 may determine a dequantization factor for the current coefficient based on whether a previous coefficient has an absolute value greater than zero. In some examples, inverse quantization unit 306 may select the dequantization factor for the current coefficient based on the dequantization factor used when dequantizing the previous coefficient and whether the previous coefficient has an absolute value greater than zero, as described above. Inverse quantization unit 306 may apply the selected dequantization factor for the current coefficient.

One way in which inverse quantization unit 306 may determine the dequantization factor is based on the context set selected by entropy decoding unit 302. For instance, if entropy decoding unit 302 selected a first context set based on whether the previous coefficient has an absolute value greater than zero, then inverse quantization unit 306 may utilize the dequantization factor Q0. If entropy decoding unit 302 selected a second context set based on whether the previous coefficient has an absolute value greater than zero, then inverse quantization unit 306 may utilize the dequantization factor Q1. Since the selection of the first or second context set is based on whether the previous coefficient has an absolute value greater than zero, inverse quantization unit 306 may be considered as selecting a dequantization factor based on whether a previous coefficient has an absolute value greater than zero.

Figure 9:
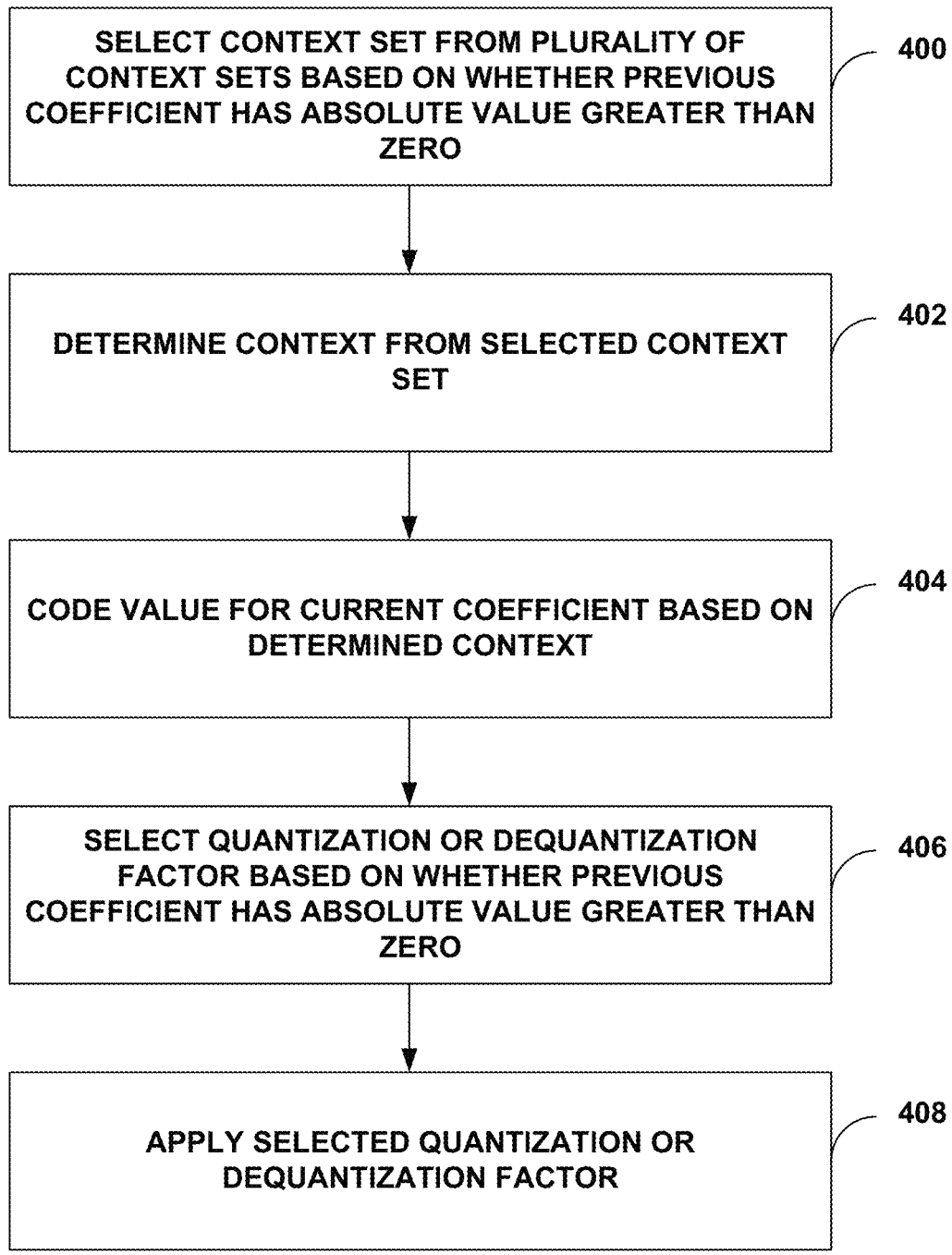
FIG. 9 is a flowchart illustrating an example method of operation in accordance with one or more example techniques described in this disclosure.

FIG. 9 is a flowchart illustrating an example method of operation in accordance with one or more example techniques described in this disclosure. For ease of illustration, the techniques are generally described with respect to a video coder, examples of which include video encoder 200 and video decoder 300. At portions of the description, further reference to components of video encoder 200 and video decoder 300 is made.

A video coder may select, for coding a current coefficient, a context set from a plurality of context sets based on whether a previous coefficient has an absolute value greater than zero (400). For example, entropy encoding unit 220, for coding a significance flag, may select a context set (e.g., a first context set or a second context set) from a plurality of context sets based on whether a previous coefficient has an absolute value greater than zero. As one example, entropy encoding unit 220 may select the context set from the plurality of context sets based on a quantization factor selected by quantization unit 208 (e.g., if quantization unit 208 selected Q0 for the current coefficient, entropy encoding unit 220 selects a first context set, and if quantization unit 208 selected Q1 for the current coefficient, entropy encoding unit 220 selects a second context set).

Entropy decoding unit 302 may determine the significance flag of the previous coefficient to determine whether the previous coefficient has an absolute value greater than zero. Entropy decoding unit 302 may select a context set from the plurality of context sets based on the significance flag of the previous coefficient (e.g., based on whether the previous coefficient has an absolute value greater than zero).

The video coder may determine a context from the selected context set (402). For example, entropy encoding unit 220 and entropy decoding unit 302 may determine the context from the selected context set based on values of neighboring coefficients. As one example, entropy encoding unit 220 and entropy decoding unit 302 may determine if none, one, or both of the right and below coefficients are significant (e.g., absolute value greater than zero), and determine an offset in the selected context set based on the determination if none, one, or both of the right and below coefficients are significant. Entropy encoding unit 220 and entropy decoding unit 302 may determine the context based on the offset.

The video coder may code a value for the current coefficient based on the determined context (404). As one example, the video coder may apply CABAC coding techniques to code a significance flag for the current coefficient based on the determined context. In examples where the video coder is video encoder 200, video encoder 200 may encode a value for the current coefficient based on the determined context. In examples where the video coder is video decoder 300, video decoder 300 may decode a value for the current coefficient based on the determined context.

In some examples, the current coefficient is a current coefficient of a coding group that includes a plurality of coefficients. The video coder (e.g., via entropy encoding unit 220 or entropy decoding unit 302) may be configured to code a significance flag of each respective coefficients in the plurality of coefficients that follow the current coefficient before coding subsequent flags used to indicate the value of the current coefficient.

As illustrated in FIG. 9, the video coder may select at least one of a quantization or dequantization factor for the current coefficient based on whether the previous coefficient has an absolute value greater than zero (406). In some examples, the video coder (e.g., inverse quantization unit 306) may be configured to select the dequantization factor based on the selected context set selected by entropy decoding unit 302. For example, if entropy decoding unit 302 selected the first context set, then inverse quantization unit 306 may select the dequantization factor Q0, and if entropy decoding unit 302 selected the second context set, then inverse quantization unit 306 may select the dequantization factor Q1.

In some examples, the video coder may select at least one of the quantization or dequantization factor based on a quantization or dequantization factor used when quantizing or dequantizing the previous coefficient (e.g., previously coded coefficient in coding order) and whether the previous coefficient has an absolute value greater than zero. For example, as illustrated in FIG. 4, the video coder may be configured to utilize the state when the previous coefficient was coded and whether the previous coefficient has an absolute value greater than zero to determine the state to transition to, and the state to transition to may indicate the quantization or dequantization factor that is to be used.

The video coder may at least one of apply the selected quantization or dequantization factor for the current coefficient (408). For example, quantization unit 208 may apply the quantization factor to generate the quantized coefficients that are entropy encoded with entropy encoding unit 220. Inverse quantization unit 306 may apply the dequantization factor to generate coefficients that are fed to inverse transform processing unit 308.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   selecting, for coding a current coefficient of the video data, a context set from a plurality of context sets based on whether a previous coefficient has an absolute value greater than zero;
   determining a context from the selected context set;
   coding a value for the current coefficient based on the determined context;
   selecting at least one of a quantization or a dequantization factor for the current coefficient based on whether the previous coefficient has an absolute value greater than zero; and
   applying at least one of the selected quantization factor or the selected dequantization factor for the current coefficient.

2. The method of claim 1, wherein selecting at least one of a quantization or a dequantization factor for the current coefficient comprises selecting the quantization factor, and wherein selecting the context set from the plurality of context sets comprises selecting the context set from the plurality of context sets based on the selected quantization factor.

3. The method of claim 1, wherein selecting at least one of a quantization or a dequantization factor for the current coefficient comprises selecting the dequantization factor, and wherein selecting the dequantization factor comprises selecting the dequantization factor based on the selected context set.

4. The method of claim 1, wherein selecting at least one of the quantization or dequantization factor comprises selecting at least one of the quantization or dequantization factor based on a quantization factor or a dequantization factor used when quantizing or dequantizing the previous coefficient and whether the previous coefficient has an absolute value greater than zero.

5. The method of claim 1, wherein the current coefficient comprises a current coefficient of a coding group that includes a plurality of coefficients, the method further comprising coding a significance flag of each respective coefficient in the plurality of coefficients that follow the current coefficient before coding subsequent flags used to indicate the value of the current coefficient.

6. The method of claim 1, wherein determining the context from the selected context set comprises determining the context from the selected context set based on values of neighboring coefficients.

7. The method of claim 1, wherein coding a value for the current coefficient based on the determined context comprises decoding the value for the current coefficient based on the determined context.

8. The method of claim 1, wherein coding a value for the current coefficient based on the determined context comprises encoding the value for the current coefficient based on the determined context.

9. A device for coding video data, the device comprising:
   a memory configured to store contexts for a plurality of context sets; and
   a video coder comprising at least one of fixed-function or programmable circuitry, wherein the video coder is configured to:
     select, for coding a current coefficient of the video data, a context set from the plurality of context sets stored in memory based on whether a previous coefficient has an absolute value greater than zero;
     determine a context from the selected context set;
     code a value for the current coefficient based on the determined context;
     select at least one of a quantization or dequantization factor for the current coefficient based on whether the previous coefficient has an absolute value greater than zero; and
     apply at least one of the selected quantization factor or the selected dequantization factor for the current coefficient.

10. The device of claim 9, wherein to select at least one of the quantization or dequantization factor, the video coder is configured to select the quantization factor, and wherein to select the context set from the plurality of context sets, the video coder is further configured to select the context set from the plurality of context sets based on the selected quantization factor.

11. The device of claim 9, wherein to select at least one of the quantization or dequantization factor, the video coder is configured to select the dequantization factor, and wherein to select the dequantization factor, the video coder is further configured to select the dequantization factor based on the selected context set.

12. The device of claim 9, wherein to select at least one of the quantization or dequantization factor, the video coder is further configured to select at least one of the quantization or dequantization factor based on a quantization factor or a dequantization factor used when quantizing or dequantizing the previous coefficient and whether the previous coefficient has an absolute value greater than zero.

13. The device of claim 9, wherein the current coefficient comprises a current coefficient of a coding group that includes a plurality of coefficients, and wherein the video coder is further configured to code a significance flag of each respective coefficient in the plurality of coefficients that follow the current coefficient before coding subsequent flags used to indicate the value of the current coefficient.

14. The device of claim 9, wherein to determine the context from the selected context set, the video coder is further configured to determine the context from the selected context set based on values of neighboring coefficients.

15. The device of claim 9, wherein the video coder comprises a video decoder, and wherein to code a value for the current coefficient based on the determined context, the video decoder is configured to decode the value for the current coefficient based on the determined context.

16. The device of claim 9, wherein the video coder comprises a video encoder, and wherein to code a value for the current coefficient based on the determined context, the video encoder is configured to encode the value for the current coefficient based on the determined context.

17. A non-transitory computer-readable storage medium storing instructions thereon that when executed cause one or more processors of a device for coding video data to:
   select, for coding a current coefficient of the video data, a context set from a plurality of context sets based on whether a previous coefficient has an absolute value greater than zero;
   determine context from the selected context set;

code a value for the current coefficient based on the determined context;
select at least one of a quantization or dequantization factor for the current coefficient based on whether the previous coefficient has an absolute value greater than zero; and
apply at least one of the selected quantization factor or the selected dequantization factor for the current coefficient.

18. The computer-readable storage medium of claim 17, wherein the instructions that cause the one or more processors to select at least one of the quantization or dequantization factor comprises instructions that cause the one or more processors to select the quantization factor, and wherein the instructions that cause the one or more processors to select the context set from the plurality of context sets comprise instructions that cause the one or more processors to select the context set from the plurality of context sets based on the selected quantization factor.

19. The computer-readable storage medium of claim 17, wherein the instructions that cause the one or more processors to select at least one of the quantization or dequantization factor comprises instructions that cause the one or more processors to select the dequantization factor, and wherein the instructions that cause the one or more processors to select the dequantization factor comprise instructions that cause the one or more processors to select the dequantization factor based on the selected context set.

20. The computer-readable storage medium of claim 17, wherein the instructions that cause the one or more processors to select at least one of the quantization or dequantization factor comprise instructions that cause the one or more processors to select at least one of the quantization or dequantization factor based on a quantization factor or a dequantization factor used when quantizing or dequantizing the previous coefficient and whether the previous coefficient has an absolute value greater than zero.

21. The computer-readable storage medium of claim 17, wherein the current coefficient comprises a current coefficient of a coding group that includes a plurality of coefficients, the instructions further comprising instructions that cause the one or more processors to code a significance flag of each respective coefficient in the plurality of coefficients that follow the current coefficient before coding subsequent flags used to indicate the value of the current coefficient.

22. The computer-readable storage medium of claim 17, wherein the instructions that cause the one or more processors to determine the context from the selected context set comprise instructions that cause the one or more processors to determine the context from the selected context set based on values of neighboring coefficients.

23. A device for coding video data, the device comprising:
means for selecting, for coding a current coefficient of the video data, a context set from a plurality of context sets based on whether a previous coefficient has an absolute value greater than zero;
means for determining context from the selected context set;
means for coding a value for the current coefficient based on the determined context;
means for selecting at least one of a quantization or dequantization factor for the current coefficient based on whether the previous coefficient has an absolute value greater than zero; and
means for applying at least one of the selected quantization factor or the selected dequantization factor for the current coefficient.

* * * * *